(12) United States Patent
Sakairi et al.

(10) Patent No.: US 9,874,180 B2
(45) Date of Patent: Jan. 23, 2018

(54) POWERING APPARATUS

(71) Applicant: Mitsui Engineering & Shipbuilding Co., Ltd., Chuo-ku, Tokyo (JP)

(72) Inventors: Nobuyuki Sakairi, Tamano (JP); Kazunori Ohta, Tamano (JP); Kousuke Matsumaru, Tamano (JP); Toshinori Shirai, Tamano (JP)

(73) Assignee: MITSUI ENGINEERING & SHIPBUILDING CO., LTD., Tokyo (JP)

( * ) Notice: Subject to any disclaimer, the term of this patent is extended or adjusted under 35 U.S.C. 154(b) by 137 days.

(21) Appl. No.: 14/975,095

(22) Filed: Dec. 18, 2015

(65) Prior Publication Data

US 2016/0177886 A1 Jun. 23, 2016

(30) Foreign Application Priority Data

Dec. 22, 2014 (JP) ................................. 2014-259139

(51) Int. Cl.
*F02B 33/44* (2006.01)
*F02M 25/07* (2006.01)
(Continued)

(52) U.S. Cl.
CPC ............... *F02M 26/05* (2016.02); *F01N 3/02* (2013.01); *F01N 3/0205* (2013.01); *F01N 3/043* (2013.01);
(Continued)

(58) Field of Classification Search
CPC ........ F02M 26/05; F02M 26/10; F02M 37/12; F01N 3/02; F01N 3/0205; F01N 3/043;
(Continued)

(56) References Cited

U.S. PATENT DOCUMENTS 4,033,135 A * 7/1977 Mandrin ................. F01K 23/02
60/618
4,038,558 A * 7/1977 Gallois ................... F01K 23/14
60/618
(Continued)

FOREIGN PATENT DOCUMENTS

JP 2008-121674 A 5/2008
JP 2011-214461 A 10/2011
(Continued)

*Primary Examiner* — Thai Ba Trieu
(74) *Attorney, Agent, or Firm* — Global IP Counselors, LLP (57) ABSTRACT

A powering apparatus has a diesel engine, a low pressure hydraulic tube containing lower pressure hydraulic fluid, a high pressure hydraulic tube containing higher pressure hydraulic fluid, a first hydraulic pump driven by the diesel engine to send hydraulic fluid from the low pressure hydraulic tube to the high pressure hydraulic tube to adjust the pressure difference within a certain range, an exhaust gas recirculating apparatus including a first hydraulic motor driven by the pressure difference and a compressor driven by the first hydraulic motor to compress a portion of exhaust gas and to supply the exhaust gas to an intake air tube, and an exhaust heat collecting apparatus including a turbine rotated by a refrigerant heated by the exhaust gas and a second hydraulic pump driven by the turbine to send hydraulic fluid from the low pressure hydraulic tube to the high pressure hydraulic tube.

9 Claims, 6 Drawing Sheets (51) Int. Cl.
*F01K 23/10* (2006.01)
*F16D 31/02* (2006.01)
*F02M 26/05* (2016.01)
*F01N 5/02* (2006.01)
*F01N 3/02* (2006.01)
*F02M 37/12* (2006.01)
*F01N 3/04* (2006.01)
*F02G 1/043* (2006.01)
*F02M 26/10* (2016.01)

(52) U.S. Cl.
CPC ............... *F01N 5/02* (2013.01); *F02G 1/043* (2013.01); *F02M 26/10* (2016.02); *F02M 37/12* (2013.01); *Y02T 10/16* (2013.01); *Y02T 70/5281* (2013.01)

(58) Field of Classification Search
CPC ........ F01N 5/02; Y02T 10/16; Y02T 70/5281; F01K 23/065; F01K 23/14; F01K 23/02
USPC .............. 60/605.2, 597, 618, 670, 486, 449
See application file for complete search history.

(56) References Cited

U.S. PATENT DOCUMENTS

| | | | | |
|---|---|---|---|---|
| 4,738,115 A * | 4/1988 | Goode | ...................... | F17C 9/02 60/618 |
| 4,763,473 A * | 8/1988 | Ziplies | .................... | F04B 17/05 60/486 |
| 5,461,861 A * | 10/1995 | Wenzel | ................. | F01K 23/065 60/618 |
| 6,041,602 A * | 3/2000 | Dickey | .................. | F02M 26/07 60/605.2 |
| 6,484,501 B1 * | 11/2002 | Mieth | ................... | F01K 23/065 60/618 |
| 7,469,540 B1 * | 12/2008 | Knapton | ............... | F01K 25/106 60/618 |
| 8,387,386 B2 | 3/2013 | Schmeltz | | |
| 8,713,939 B2 * | 5/2014 | Tsuchino | .............. | F01K 23/065 60/618 |
| 8,752,378 B2 * | 6/2014 | Ernst | ..................... | F01K 23/065 60/286 |
| 8,915,082 B2 * | 12/2014 | Sun | ....................... | F01K 23/065 60/605.2 |
| 9,341,087 B2 * | 5/2016 | Hall | ...................... | F01K 23/065 60/618 |
| 2005/0262842 A1 * | 12/2005 | Claassen | ............... | F01K 23/065 60/618 |
| 2009/0173071 A1 * | 7/2009 | Kapich | .................. | F02M 26/23 60/605.2 |
| 2012/0134776 A1 | 5/2012 | Bou Lawz Ksayer et al. | | |
| 2012/0222420 A1 * | 9/2012 | Geskes | ................. | F01K 23/065 60/618 |
| 2013/0174541 A1 * | 7/2013 | Meinheit | ................ | B60K 25/02 60/486 |
| 2013/0312408 A1 * | 11/2013 | Murata | .............. | F02M 21/0215 60/605.1 |
| 2015/0267725 A1 * | 9/2015 | Wang | ...................... | F01K 13/02 60/670 |

FOREIGN PATENT DOCUMENTS

| | | |
|---|---|---|
| JP | 2012-047056 A | 3/2012 |
| JP | 2012-172647 A | 9/2012 |
| JP | 2012-177333 A | 9/2012 |
| JP | 2012-524862 A | 10/2012 |
| JP | 2013-234662 A | 11/2013 |
| JP | 2014-125990 A | 7/2014 |

* cited by examiner

POWERING APPARATUS

CROSS REFERENCE TO RELATED APPLICATION

This application is based upon and claims the benefit of priority of the Japanese Patent Application No. 2014-259139 filed in the Japan Patent Office on Dec. 22, 2014, the entire contents of which are incorporated herein by reference.

TECHNICAL FIELD

The present invention relates to a powering apparatus to drive a gas burning diesel engine for marine vessels.

RELATED ART

The International Convention for the Prevention of Pollution from Ships (MARPOL) adopted at International Maritime Organization (IMO), which has went into effect, determines regulations (for example, NOx emission, SOx emission, $CO_2$ emission) to prevent air pollution caused by diesel engines with power of 130 kW or higher in Annex VI that entered into force in 2005. The agreement to the Annex is planned to be enhanced every five years after the entering into force. The second standard (Tier II) introduced in 2011 and the third standard (IMO Tier III) to be introduced in 2016 have been adopted.

Tier III sets limits on the amount of nitrogen oxide (NOx) in emission in correlation with engine operating speeds. The limits are determined by a function of a rated engine speed per minute (rpm). Much severe limits are set for engines operating at low speeds.

In general, NOx emission depends on the reaction speed between nitrogen and oxygen. The amount of NOx emission is greater at a higher reaction speed. Because the reaction speed increases as the temperature rises, NOx emission can be reduced by reducing the combustion temperature in an engine.

For this reason, an exhaust gas recirculation (EGR) apparatus is proposed that introduces a portion of exhaust gas of an engine into intake air supplied to a combustion chamber to reduce the percentage of the compressed intake air, that is to reduce the percentage of oxygen in the intake air, so as to reduce the combustion speed. By reducing the combustion speed, NOx emission during an engine operation is reduced (for example, see JP2012-47056A).

Meanwhile, natural gas, which produces relatively small amount of $CO_2$ when burned, is especially focused to be used as fuel for slow speed diesel engines to reduce $CO_2$ emission. A slow speed diesel engine can produce high power with high heat efficiency by burning high pressure natural gas injected into a combustion chamber. The high pressure natural gas injected into a combustion chamber of a slow speed diesel engine can be provided by, for example, vaporizing pressurized liquefied natural gas (hereinafter referred to as "LNG") by heating. Specifically, LNG stored in a tank is pressurized by a liquid pump and then heated in a heat exchanger. The heated natural gas is injected into a combustion chamber of a slow speed diesel engine (for example, see JP2012-177333A).

SUMMARY

The temperature of exhaust gas of the engine is higher than the temperature of intake air because of the combustion reaction taking place in a combustion chamber. When a portion of the high temperature exhaust gas is simply introduced into the intake air, the combustion temperature rises, which may result in the increase in NOx emission. For this reason, the collected exhaust gas has to be cooled before introduced into the intake air which is supplied to the combustion chamber. In this case, the heat energy in the exhaust gas is not efficiently used, namely, wasted.

The present invention is made in view to solve the aforementioned problem. The object of the present invention is to provide a powering apparatus that can efficiently collect the energy in the exhaust gas of a diesel engine and can effectively use the collected energy.

One embodiment of a powering apparatus has: a diesel engine; a low pressure hydraulic tube containing hydraulic fluid; a high pressure hydraulic tube containing hydraulic fluid, hydraulic pressure in the high pressure hydraulic tube being higher than hydraulic pressure in the low pressure hydraulic tube, a difference in hydraulic pressure between the high pressure hydraulic tube and the low pressure hydraulic tube being within a certain range; a first hydraulic pump driven by the diesel engine to send hydraulic fluid from the low pressure hydraulic tube to the high pressure hydraulic tube and configured to adjust the difference in hydraulic pressure between the high pressure hydraulic tube and the low pressure hydraulic tube within a certain range; an exhaust gas recirculating apparatus including a first hydraulic motor driven by the difference in hydraulic pressure between the high pressure hydraulic tube and the low pressure hydraulic tube and a compressor driven by the first hydraulic motor to compress a portion of exhaust gas of the diesel engine and to supply the exhaust gas to an intake air tube of the diesel engine; and an exhaust heat collecting apparatus including a turbine and a second hydraulic pump, the turbine being configured to rotate by a refrigerant heated by absorbing heat of the exhaust gas, the second hydraulic pump being driven by the turbine and configured to send hydraulic fluid from the low pressure hydraulic tube to the high pressure hydraulic tube.

BRIEF DESCRIPTION OF DRAWINGS

Referring now to the attached drawings which form a part of this original disclosure.

DETAILED DESCRIPTION

A powering apparatus according to an embodiment of the present invention will now be described.

Figure 1:
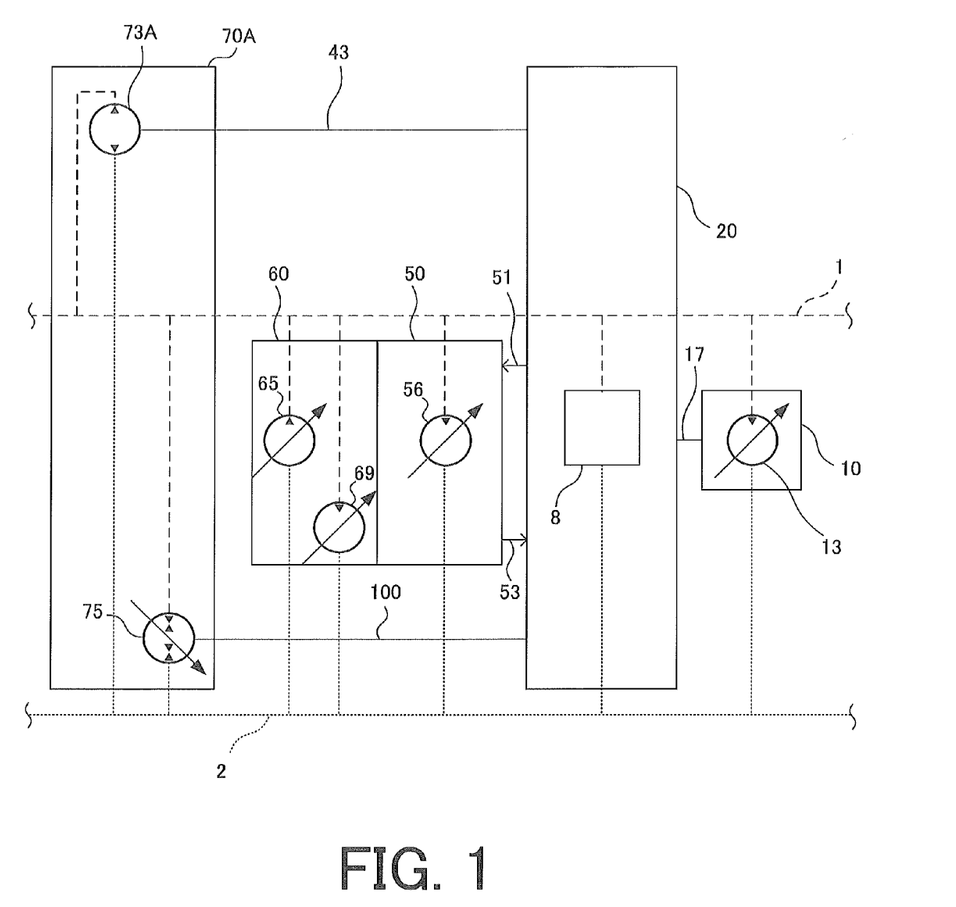
FIG. 1 is a block diagram illustrating an overall configuration of a power controlling apparatus according to an embodiment.

FIG. 1 is a block diagram illustrating an overall configuration of a power controlling apparatus according to the embodiment. The power controlling apparatus according to the embodiment of the present invention includes a fuel supplying apparatus 10, a main engine unit 20, an exhaust gas recirculating apparatus 50, an exhaust heat collecting apparatus 60, and an exhaust gas energy collecting apparatus 70A. All the components of the power controlling apparatus are mounted on a marine vessel.

A high pressure hydraulic tube 1 and a low pressure hydraulic tube 2 are commonly used for the fuel supplying apparatus 10, the main engine unit 20, the exhaust gas recirculating apparatus 50, an exhaust heat collecting apparatus 60, and the exhaust gas energy collecting apparatus 70A.

In the embodiment, a hydraulic pump 75 is driven in conjunction with a main shaft 100 of the diesel engine to adjust the hydraulic pressure in the high pressure hydraulic tube 1 to be higher than the hydraulic pressure in the low pressure hydraulic tube 2. As will be described below, the hydraulic pressure in the high pressure hydraulic tube 1 is used for driving the fuel supplying apparatus 10 and the exhaust gas recirculating apparatus 50.

Fuel gas is supplied from the fuel supplying apparatus 10 to the main engine unit 20 through a tube 17. In the fuel supplying apparatus 10, a fuel pump is used to supply fuel gas to the main engine unit 20, and a hydraulic motor 13 is used to drive the fuel pump. The hydraulic motor 13 is driven by the hydraulic pressure in the high pressure hydraulic tube 1.

The main engine unit 20 includes a diesel engine as a main engine which burns fuel gas in the engine together with the compressed air taken in from outside to rotate the main shaft 100. A hydraulic control unit 8 controls a valve for supplying the fuel gas to the diesel engine and a valve for ejecting exhaust gas from the diesel engine. The hydraulic control unit 8 is driven by the hydraulic pressure in the high pressure hydraulic tube 1.

A portion of the exhaust gas ejected from the diesel engine of the main engine unit 20 is supplied from an exhaust gas circulating tube 51 to the exhaust gas recirculating apparatus 50. The portion of the exhaust gas is cleaned of environmental pollutants, compressed, and then supplied to the diesel engine through an exhaust gas circulating tube 53. A hydraulic motor 56 is used to drive a compressor for compressing the exhaust gas. The hydraulic motor 56 is driven by the hydraulic pressure in the high pressure hydraulic tube 1.

The exhaust heat collecting apparatus 60 is provided with a hydraulic pump 65 to raise the hydraulic pressure in the high pressure hydraulic tube 1.

In the exhaust heat collecting apparatus 60, a turbine is rotated using the thermal energy in the exhaust gas and in the compressed air supplied to the inlet of the diesel engine, and the hydraulic pump 65 is driven by the torque generated by the turbine. The pressure of hydraulic fluid in the high pressure hydraulic tube 1 is raised by driving the hydraulic pump 65.

The exhaust gas energy collecting apparatus 70A is provided with a hydraulic pump 73A to raise the hydraulic pressure in the high pressure hydraulic tube 1.

In the exhaust gas energy collecting apparatus 70A, a torque generated by a supercharger in the main engine unit 20 is transmitted to the hydraulic pump 73A via a rotating shaft 43, and thereby the hydraulic pump 73A is driven to raise the pressure of the hydraulic fluid in the high pressure hydraulic tube 1. If the torque generated by the supercharger is not sufficiently high, the hydraulic pump 73A can be used as a hydraulic motor to assist the rotation of the supercharger.

In this manner, the energy of the exhaust gas exhausted from the diesel engine of the main engine unit 20 is collected by the exhaust heat collecting apparatus 60 and the exhaust gas energy collecting apparatus 70A to be used in a form of hydraulic pressure, namely, the collected energy can be used effectively.

The configuration of each of the fuel supplying apparatus 10, the main engine unit 20, the exhaust gas recirculating apparatus 50, the exhaust heat collecting apparatus 60, and the exhaust gas energy collecting apparatus 70A will now be described in detail.

Fuel Supplying Apparatus

Figure 2:
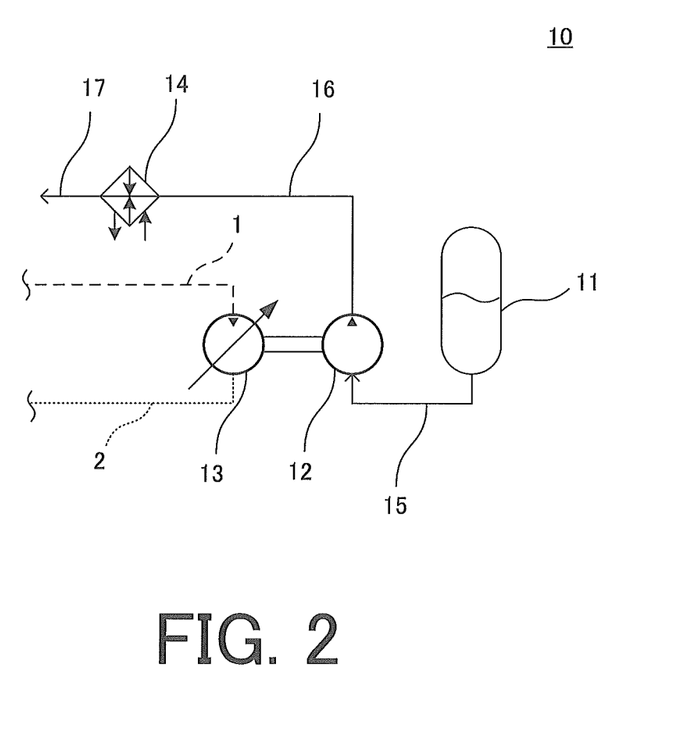
FIG. 2 is a block diagram illustrating a fuel supplying apparatus 10 according to the embodiment.

FIG. 2 is a block diagram illustrating a fuel supplying apparatus 10. The fuel supplying apparatus 10 supplies high pressure fuel produced by pressurizing liquid fuel to the main engine unit 20. The fuel supplying apparatus 10 includes a liquid fuel tank 11, a fuel pump 12, a hydraulic motor 13, and a heat exchanger 14.

The liquid fuel tank 11 stores liquid fuel which is to be supplied to the main engine unit 20. Liquid fuel is, for example, liquefied natural gas (LNG) or liquefied petroleum gas (LPG). An example case where LNG is used as liquid fuel will be described below.

The pressure in the liquid fuel tank 11 is, for example, approximately 0.1 MPa (atmospheric pressure). The temperature of the liquid fuel, LNG in this case, is approximately −160° C.

The bottom of the liquid fuel tank 11 is coupled to the fuel pump 12 via a tube 15.

The fuel pump 12 is coupled to the bottom of the liquid fuel tank 11 via the tube 15 and also coupled to the heat exchanger 14 via a tube 16. The fuel pump 12 is driven by the hydraulic motor 13 to pressurize the liquid fuel in the liquid fuel tank 11 and send out the pressurized liquid fuel to the heat exchanger 14.

For example, the fuel pump 12 may be a reciprocating pump, which has a reciprocating part. The rotational motion of the hydraulic motor 13 driving the fuel pump 12 is converted into a reciprocating motion of the moving part by, for example, a crank mechanism (not illustrated).

The rotational speed of the fuel pump 12 is controlled so as to keep the pressure of the fuel gas supplied to the main engine unit 20 constant.

The liquid fuel sent out from the fuel pump 12 is then heated in the heat exchanger 14. For example, a shell and tube heat exchanger may be used as the heat exchanger 14. A heat source may be a hot water. The fuel gas heated in the heat exchanger 14 is supplied to the main engine unit 20 illustrated in FIG. 3 via a tube 17. If the fuel pump 12 is configured to compress and send out vaporized fuel gas, the heat exchanger 14 is not needed.

The hydraulic motor 13 is coupled to the high pressure hydraulic tube 1 and the low pressure hydraulic tube 2. The hydraulic pressure in the high pressure hydraulic tube 1 is relatively higher than that of the hydraulic pressure in the low pressure hydraulic tube 2. The high pressure hydraulic tube 1 and the low pressure hydraulic tube 2 are commonly used for controlling the hydraulic driving mechanisms of the fuel supplying apparatus 10, the main engine unit 20, the exhaust gas recirculating apparatus 50, the exhaust heat collecting apparatus 60, and the exhaust gas energy collecting apparatus 70A. The hydraulic motor 13 is rotated using the difference in pressure of hydraulic fluid between the high pressure hydraulic tube 1 and the low pressure hydraulic tube 2, to drive the fuel pump 12. The hydraulic motor 13 is a variable displacement motor that adjusts its rotational speed according to the pressure of liquid fuel in the tube 16.

A pressure gauge (not illustrated) for measuring the pressure of the liquid fuel in the tube 16 is provided on the tube 17. The rotational speed of the hydraulic motor 13 is adjusted based on a value measured by the pressure gauge.

Main Engine Unit

Figure 3:
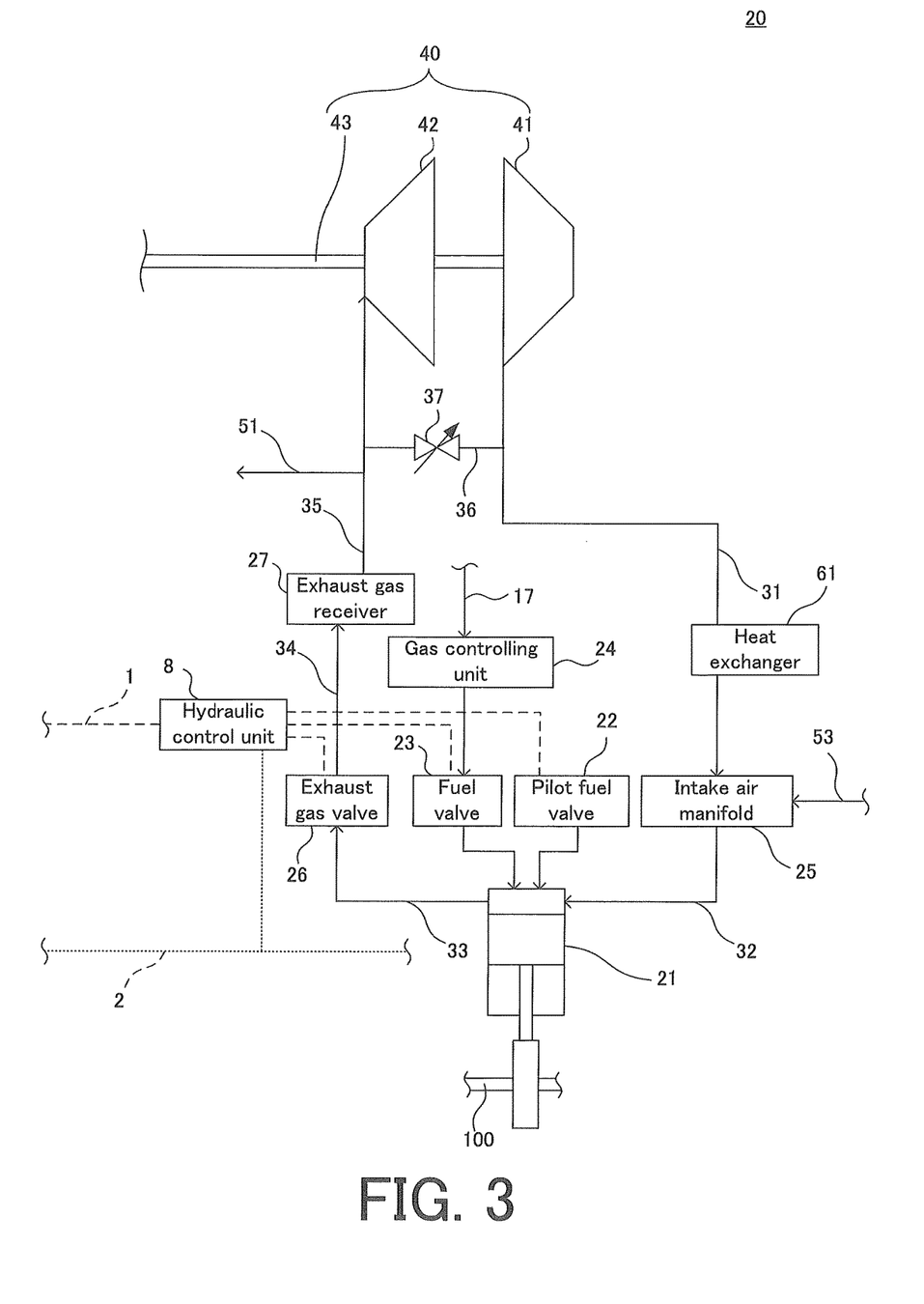
FIG. 3 is a block diagram illustrating a main engine unit 20 according to the embodiment.

FIG. 3 is a block diagram illustrating the main engine unit 20. The main engine unit 20 includes an internal combustion engine 21, a pilot fuel valve 22, a fuel valve 23, a gas controlling unit 24, an intake air manifold 25, an exhaust gas valve 26, an exhaust gas receiver 27, and a supercharger 40.

The internal combustion engine 21 uses an alternative fuel such as methanol and natural gas. For example, the internal combustion engine 21 may be a slow speed diesel engine having a two-stroke cycle cylinder. The internal combustion engine 21 rotates the main shaft 100 to power a marine vessel.

The pilot fuel valve 22 injects a pilot fuel into the combustion chamber of the internal combustion engine 21 when starting the internal combustion engine 21. Opening and closing of the pilot fuel valve 22 is controlled by the hydraulic control unit 8.

The fuel valve 23 injects the fuel gas supplied from the fuel supplying apparatus 10 into the combustion chamber of the internal combustion engine 21. Opening and closing of the fuel valve 23 is controlled by the hydraulic control unit 8.

The gas controlling unit 24 includes a main valve for adjusting the fuel gas supplied from the fuel supplying apparatus 10 via the tube 17 to control the supply of fuel gas to the fuel valve 23.

Figure 4:
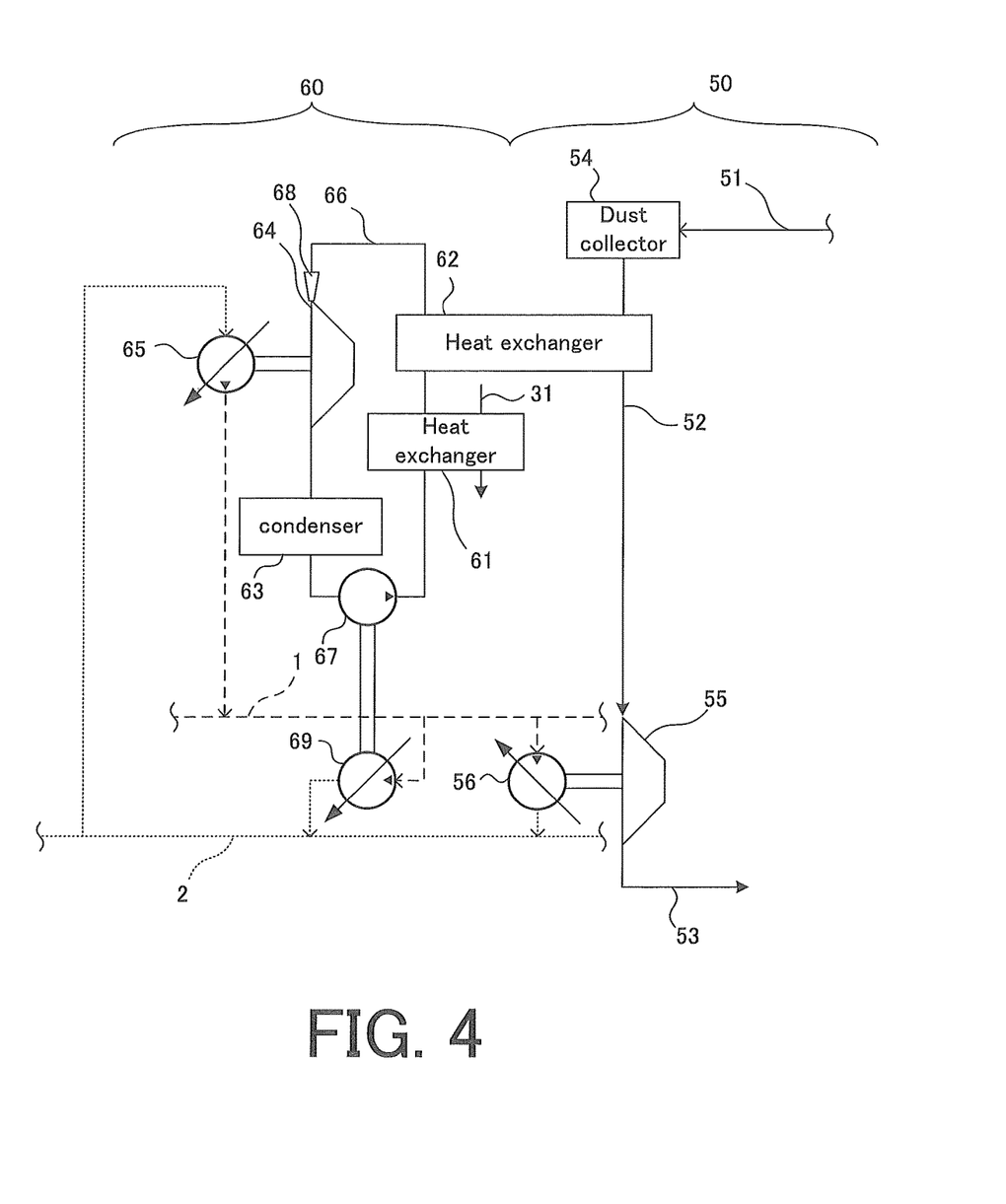
FIG. 4 is a block diagram illustrating an exhaust gas recirculating apparatus 50 and an exhaust heat collecting apparatus 60 according to the embodiment.

The intake air manifold 25 is coupled to the supercharger 40 via an intake air tube 31, to the combustion chamber of the internal combustion engine 21 via an intake air tube 32, and to the exhaust gas recirculating apparatus 50 illustrated in FIG. 4 via the exhaust gas circulating tube 53. The intake air manifold 25 mixes the compressed air supplied from the intake air tube 31 with the exhaust gas supplied from the exhaust gas circulating tube 53, stores the resulting mixed gas, and supplies the mixed gas to the combustion chamber of the internal combustion engine 21 through the intake air tube 32.

The exhaust gas valve 26 is coupled to the combustion chamber of the internal combustion engine 21 via an exhaust gas tube 33 and to the exhaust gas receiver 27 via an exhaust gas tube 34. The exhaust gas valve 26 is for ejecting the gas from the combustion chamber of the internal combustion engine 21. Opening and closing of the exhaust gas valve 26 is controlled by the hydraulic control unit 8.

The hydraulic control unit 8 uses the pressure difference between the high pressure hydraulic tube 1 and the low pressure hydraulic tube 2 to control opening and closing of the pilot fuel valve 22, the fuel valve 23, and the exhaust gas valve 26.

The exhaust gas receiver 27 is coupled to the exhaust gas valve 26 via the exhaust gas tube 34 and to the supercharger 40 via an exhaust gas tube 35. The exhaust gas receiver 27 stores the exhaust gas ejected from the combustion chamber of the internal combustion engine 21 through the exhaust gas valve 26.

The exhaust gas circulating tube 51 branches from the exhaust gas tube 35 to be coupled to the exhaust gas recirculating apparatus 50. A portion of the exhaust gas ejected from the exhaust gas receiver 27 is supplied to the exhaust gas recirculating apparatus 50 through the exhaust gas circulating tube 51 as illustrated in FIG. 4.

A bypass tube 36 is provided between the exhaust gas tube 35 and the intake air tube 31 to provide a passage bypassing between the exhaust gas tube 35 and the intake air tube 31. The bypass tube 36 is provided with a bypass valve 37. The opening of the bypass valve 37 is adjusted based on the pressure in the intake air manifold 25.

The supercharger 40 includes a compressor 41, a turbine 42, and a rotating shaft 43. The compressor 41 is coupled to the intake air tube 31. The compressor 41 suctions air from outside and compresses the air. The outside air compressed by the compressor 41 (compressed air) is supplied to the intake air manifold 25 through the intake air tube 31.

The turbine 42 is coupled to the exhaust gas tube 35. The exhaust gas supplied from the exhaust gas tube 35 rotates the turbine 42. The rotating shaft 43 transmits the torque from the turbine 42 to the compressor 41 to drive the compressor 41. The rotating shaft 43 is coupled to the exhaust gas energy collecting apparatus 70A illustrated in FIG. 5 to transmit the torque from the turbine 42 to the exhaust gas energy collecting apparatus 70A.

Exhaust Gas Recirculating Apparatus

FIG. 4 is a block diagram illustrating an exhaust gas recirculating apparatus 50 and the exhaust heat collecting apparatus 60. The exhaust gas recirculating apparatus 50 includes a dust collector 54, a compressor 55, and a hydraulic motor 56.

The dust collector 54 is coupled to the exhaust gas circulating tube 51 and an exhaust gas circulating tube 52, and removes environmental pollutants in the exhaust gas supplied from the exhaust gas circulating tube 51. For example, sulfur oxides in the exhaust gas are removed by the dust collector 54 through neutralization with aqueous solution of sodium hydroxide. The exhaust gas clear of environmental pollutants is ejected into the exhaust gas circulating tube 52.

The compressor 55 is coupled to the exhaust gas circulating tube 52 and the exhaust gas circulating tube 53, and compresses the exhaust gas supplied from the exhaust gas circulating tube 52. The compressed exhaust gas is supplied to the intake air manifold 25 illustrated in FIG. 3 through the exhaust gas circulating tube 53.

The hydraulic motor 56 is coupled to the high pressure hydraulic tube 1 and the low pressure hydraulic tube 2. The hydraulic motor 56 is rotated by the pressure difference between the high pressure hydraulic tube 1 and the low pressure hydraulic tube 2 to drive the compressor 55. The hydraulic motor 56 is a variable displacement motor that adjusts its rotational speed according to the concentration of oxygen in the intake air manifold 25. The intake air manifold 25 is provided with an oxygen concentration meter (not illustrated) for measuring the concentration of oxygen in the intake air manifold 25. The rotational speed of the hydraulic motor 56 is adjusted based on a value measured by the oxygen concentration meter.

Low Temperature Exhaust Heat Collecting Apparatus

The low temperature exhaust heat collecting apparatus (hereinafter referred to as "exhaust heat collecting apparatus 60") includes a heat exchangers 61 and 62, a condenser 63, a two-phase flow turbine 64, a hydraulic pump 65, a coolant circuit 66, a circulating pump 67, and a two-phase flow nozzle 68.

The heat exchangers 61 and 62, the condenser 63, and the two-phase flow turbine 64 are coupled to form a circuit via the coolant circuit 66. A refrigerant is contained in the coolant circuit 66. For example, an organic refrigerant having a boiling point lower than water (e.g., an alternative for chlorofluorocarbon such as hydrochlorofluorocarbons or hydrofluorocarbons) can preferably be used as the refrigerant.

The circulating pump 67 is provided on the coolant circuit 66. The circulating pump 67 circulates the refrigerant in the coolant circuit 66 to pass through the heat exchanger 61, the heat exchanger 62, the two-phase flow turbine 64, and the condenser 63 in this order. The liquid refrigerant circulating in the coolant circuit 66 is heated in the heat exchangers 61 and 62 and then supplied to the two-phase flow turbine 64 through the two-phase flow nozzle 68.

The two-phase flow nozzle 68 injects the liquid-phase refrigerant heated in the heat exchangers 61 and 62 into the gas-phase refrigerant. Thus, the refrigerant is ejected from the two-phase flow nozzle 68 in a form of a gas-liquid-two-phase flow (two-phase flow jet) to the two-phase flow turbine 64.

The two-phase flow turbine 64 is rotated by the refrigerant ejected in a form of a gas-liquid-two-phase flow from the two-phase flow nozzle 68 to drive the hydraulic pump 65. The rotation of the two-phase flow turbine 64 is adjusted by the flow rate of the gas-liquid-two-phase flow ejected from the two-phase flow nozzle 68. The refrigerant rotating the two-phase flow turbine 64 is then cooled in the condenser 63 and liquefied.

With the two-phase flow turbine 64 and the two-phase flow nozzle 68, exhaust heat can be used under the condition where the refrigerant is not completely vaporized. For this reason, the exhaust heat can be collected even from a low temperature (70° C. to 250° C.) heat source. Since gas and liquid need not be separated, a gas-liquid separator and a preheater for preheating the refrigerant are not necessary. By adjusting the flow rate of the gas-liquid-two-phase flow ejected from the two-phase flow nozzle 68, the rotation of the two-phase flow turbine 64 can be controlled. Thus, a reducer need not be provided between the two-phase flow turbine 64 and the hydraulic pump 65.

The circulating pump 67 may be powered by a hydraulic motor 69. The hydraulic motor 69 is coupled to the high pressure hydraulic tube 1 and the low pressure hydraulic tube 2. The hydraulic motor 69 is rotated by the pressure difference between the high pressure hydraulic tube 1 and the low pressure hydraulic tube 2 to drive the circulating pump 67. The hydraulic motor 69 is a variable displacement motor. Because the amount of heat energy collected in the exhaust heat collecting apparatus 60 depends on the amount of exhaust gas collected in the exhaust gas recirculating apparatus 50, the power of the circulating pump 67 is controlled according to the power of the hydraulic motor 56 driving the compressor 55.

The heat exchanger 61 exchanges heat between the coolant circuit 66 and the intake air tube 31 of the main engine unit 20. The temperature of the compressed air flowing in the intake air tube 31 is high because the air has been adiabatically compressed by the compressor 41. By exchanging heat between the compressed air and the refrigerant in the coolant circuit 66, the compressed air in the intake air tube 31 is cooled and the refrigerant in the coolant circuit 66 is heated.

The heat exchanger 62 exchanges heat between the coolant circuit 66 and the exhaust gas circulating tube 52 of the exhaust gas recirculating apparatus 50. By exchanging heat between the high temperature exhaust gas in the exhaust gas circulating tube 52 and the refrigerant in the coolant circuit 66, the exhaust gas in the exhaust gas circulating tube 52 is cooled and the refrigerant in the coolant circuit 66 is heated.

For example, a shell and tube heat exchanger may be used for the heat exchangers 61 and 62.

The condenser 63 is a heat exchanger that cools the refrigerant in the coolant circuit 66 to liquefy. For example, a surface condenser may be used as the condenser 63. For example, sea water may be used as a low temperature heat transfer medium for cooling the refrigerant.

The hydraulic pump 65 is connected to the turbine 64. The vaporized refrigerant rotates the turbine 64 to drive the hydraulic pump 65.

The hydraulic pump 65 coupled to the high pressure hydraulic tube 1 and the low pressure hydraulic tube 2 is driven by the torque from the turbine 64. The hydraulic pump 65 sends out hydraulic fluid from the low pressure hydraulic tube 2 to the high pressure hydraulic tube 1 to increase the pressure difference between the high pressure hydraulic tube 1 and the low pressure hydraulic tube 2. The hydraulic pump 65 is a variable displacement pump that adjusts its rotational speed according to the rotational speed of the turbine 64. The rotational speed of the turbine 64 is adjusted by the flow rate of the refrigerant flowing into a turbine case of the turbine 64. The flow rate of the refrigerant is adjusted by controlling the opening of a valve (not illustrated) provided at the inlet of the turbine case.

Exhaust Gas Energy Collecting Apparatus

Figure 5:
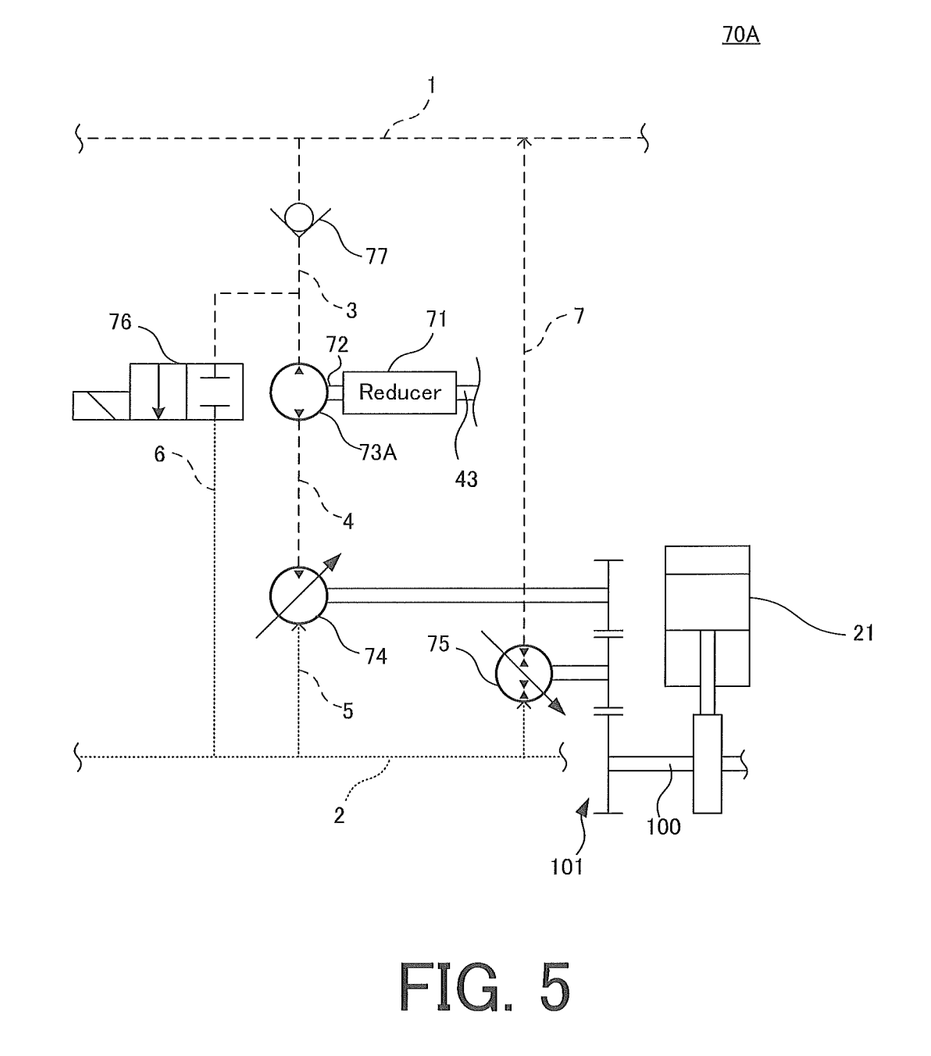
FIG. 5 is a block diagram illustrating an exhaust gas energy collecting apparatus 70A according to the embodiment.

The exhaust gas energy collecting apparatus 70A includes a reducer 71, a rotating shaft 72, hydraulic pumps 73A, 74, and 75, an open/close valve 76, and a check valve 77.

The reducer 71 is connected to the rotating shaft 43 of the supercharger 40 illustrated in FIG. 3 and reduces the rotational speed of the rotating shaft 43 to transmit a torque to the rotating shaft 72.

The hydraulic pump 73A is coupled to a hydraulic pressure tube 3 and a hydraulic pressure tube 4. The hydraulic pump 73A is driven by the torque from the rotating shaft 72 to send hydraulic fluid from the hydraulic pressure tube 4 to the hydraulic pressure tube 3.

The hydraulic pressure tube 3 is coupled to the high pressure hydraulic tube 1. The check valve 77 is provided between an outlet of the hydraulic pump 73A and the high pressure hydraulic tube 1 on the hydraulic pressure tube 3. The hydraulic pressure tube 3 is coupled to the low pressure hydraulic tube 2 via a bypass tube 6 between the hydraulic pump 73A and the check valve 77. The open/close valve 76 is provided on the bypass tube 6.

The hydraulic pump 74 is coupled to the hydraulic pressure tube 4 and a hydraulic pressure tube 5, and connected to a transmission 101 provided on the main shaft 100. The hydraulic pressure tube 5 is coupled to the low pressure hydraulic tube 2. The hydraulic pump 74 is driven by the torque from the main shaft 100 via the transmission 101 to send hydraulic fluid from the hydraulic pressure tube 5 to the hydraulic pressure tube 4. The hydraulic pump 74 is a variable displacement pump.

The hydraulic pump 75 is provided on a hydraulic pressure tube 7 providing a passage between the high pressure hydraulic tube 1 and the low pressure hydraulic tube 2. The hydraulic pump 75 is driven by the torque from the main shaft 100 via the transmission 101 to send hydraulic fluid from the low pressure hydraulic tube 2 to the high pressure hydraulic tube 1 via the hydraulic pressure tube 7. The hydraulic pump 75 is a variable displacement pump that adjusts the amount of hydraulic fluid sent from the low pressure hydraulic tube 2 to the high pressure hydraulic tube 1 according to the pressure difference between the low pressure hydraulic tube 2 and the high pressure hydraulic tube 1 so as to keep the pressure difference between the low pressure hydraulic tube 2 and the high pressure hydraulic tube 1 within a certain range.

When the load on the main engine is small, such that the energy provided by the turbine 42 is smaller than the energy required for the compressor 41 of the supercharger 40, the open/close valve 76 is opened and hydraulic fluid in the hydraulic pressure tube 3 is sent to the low pressure hydraulic tube 2 via a bypass tube 6 to operate the hydraulic pump 73A as a hydraulic motor by the hydraulic pressure provided by the hydraulic pump 74 to assist the rotation of the supercharger 40. The rotation of the hydraulic pump 73A operating as a hydraulic motor is controlled by the pressure difference between the hydraulic pressure tube 4 and the low pressure hydraulic tube 2 adjusted by the hydraulic pump 74.

Since the check valve 77 is provided between a connection to the bypass tube 6 and a connection to the high pressure hydraulic tube 1 on the hydraulic pressure tube 3, hydraulic fluid does not flow from the high pressure hydraulic tube 1 to the bypass tube 6 when the open/close valve 76 is opened.

Modification

Figure 6:
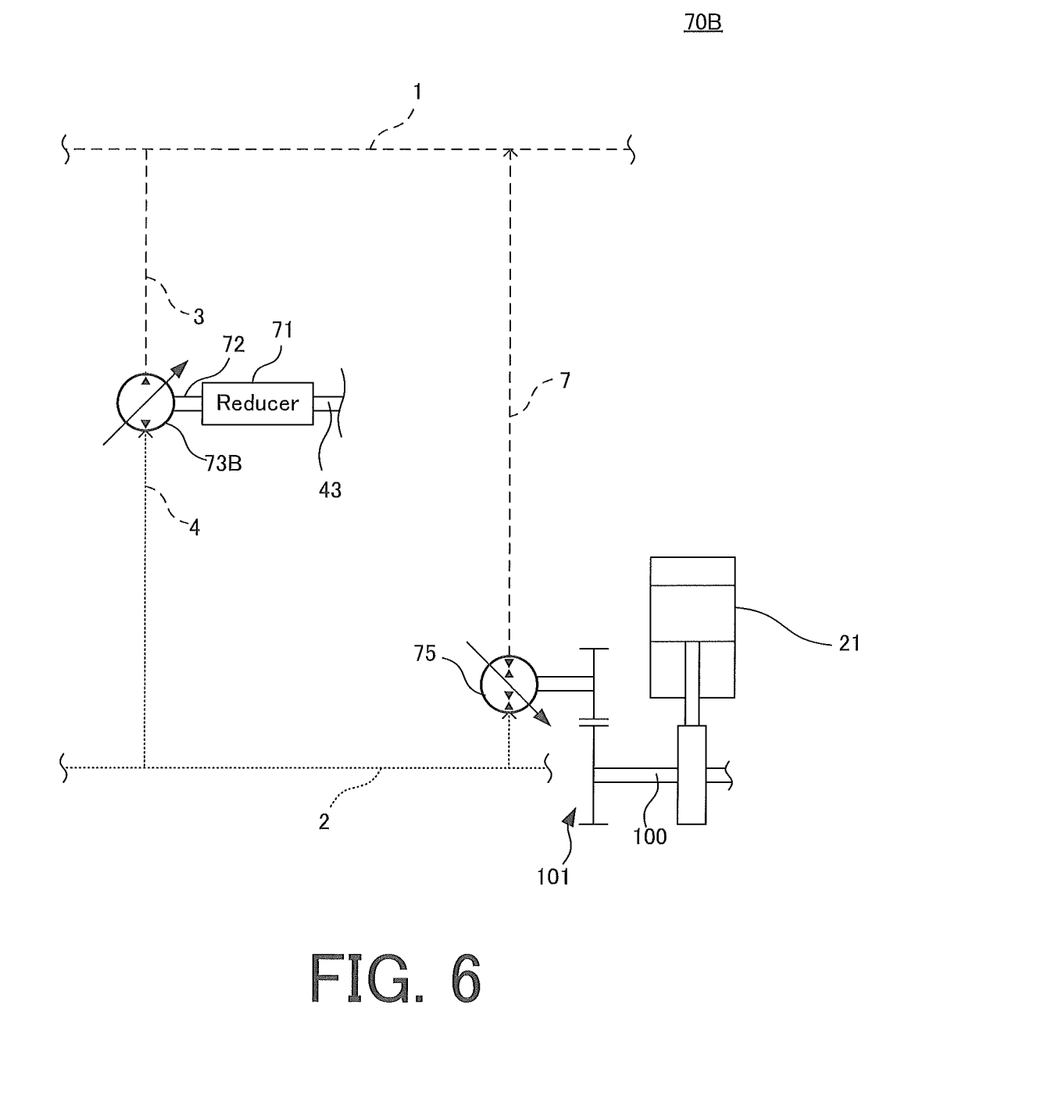
FIG. 6 is a block diagram illustrating an exhaust gas energy collecting apparatus 70B according to an exemplary modification of the present invention.

FIG. 6 is a block diagram illustrating an exhaust gas energy collecting apparatus 70B according to an exemplary modification of the exhaust gas energy collecting apparatus. The exhaust gas energy collecting apparatus 70B includes a reducer 71, a rotating shaft 72, and hydraulic pumps 73B and 75. Description on the configuration similar to that of the exhaust gas energy collecting apparatus 70A is omitted.

In the exemplary modification, the hydraulic pressure tube 3 provides a passage between the high pressure hydraulic tube 1 and the hydraulic pump 73B, and the hydraulic pressure tube 4 provides a passage between the low pressure hydraulic tube 2 and the hydraulic pump 73B.

The hydraulic pump 73B is driven by the torque from the rotating shaft 72 to send hydraulic fluid from the hydraulic pressure tube 4 to the hydraulic pressure tube 3. The hydraulic pump 73B is a variable displacement pump of which displacement can be varied by controlling its swash plate angle within a range from 0 to +100%. By controlling the swash plate angle within a range from 0 to −100%, the hydraulic pump 73B can be used as a variable displacement hydraulic motor. When the load on the main engine is small, such that the energy provided by the turbine 42 is smaller than the energy required for the compressor 41 of the supercharger 40, the hydraulic pump 73B can be used as a hydraulic motor to assist the rotation of the supercharger 40. The power of the hydraulic pump 73B is adjusted according to the pressure of the mixed gas in the intake air manifold 25.

In the embodiment and the modification, the heat of a portion of the exhaust gas of the internal combustion engine 21 is transferred from the exhaust gas circulating tube 52 to the coolant circuit 66 to be used for rotating the turbine 64. The turbine 64 drives the hydraulic pump 65, and thereby the hydraulic pump 65 produces hydraulic pressure which is used to compress the exhaust gas in the exhaust gas circulating tube 52. In this manner, the energy in the exhaust gas can be used effectively. Moreover, by cooling the exhaust gas before the compression, the exhaust gas can be compressed efficiently.

The turbine 42 is rotated by the exhaust gas of the internal combustion engine 21. The energy of the turbine 42 is used to compress the air supplied to the intake air tube 31 and a surplus energy drives the hydraulic pump 73A or 73B to produce usable hydraulic energy. Meanwhile, when the engine power as well as the exhaust gas energy is small, the hydraulic pump 73A or 73B can be used as a hydraulic motor for driving the compressor 41.

The hydraulic motor 13 drives the fuel pump 12 to supply fuel to the internal combustion engine 21, namely, the hydraulic pressure energy produced by the hydraulic pump 65 and the hydraulic pump 73A or 73B can be used effectively.

The hydraulic control unit 8 controls opening and closing of the pilot fuel valve 22, the fuel valve 23, and the exhaust gas valve 26 of the internal combustion engine 21, namely, the hydraulic pressure energy produced by the hydraulic pump 65 and the hydraulic pump 73A or 73B can be used effectively.

The hydraulic motor drives the circulating pump 67 to circulate the refrigerant in the coolant circuit 66, namely, the hydraulic pressure energy produced by the hydraulic pump 65 and the hydraulic pump 73A can effectively be used effectively.

In the above description, LNG is used as liquid fuel, although other liquid fuels such as LPG can be used in the embodiment of the present invention. The hydraulic pressure tubes, the valves, and the pumps are described by way of example, and not by way of limitation of the scope of the present invention.

What is claimed is:

1. A powering apparatus comprising:
   a diesel engine;
   a low pressure hydraulic tube containing hydraulic fluid;
   a high pressure hydraulic tube containing a hydraulic fluid, a hydraulic pressure in the high pressure hydraulic tube being higher than a hydraulic pressure in the low pressure hydraulic tube,
   wherein a difference in the hydraulic pressure between the high pressure hydraulic tube and the low pressure hydraulic tube is within a certain range;
   a first hydraulic pump driven by the diesel engine to supply the hydraulic fluid from the low pressure hydraulic tube to the high pressure hydraulic tube and configured to adjust the difference in the hydraulic pressure between the high pressure hydraulic tube and the low pressure hydraulic tube within the certain range;
   an exhaust gas recirculating apparatus including
      a hydraulic motor driven by the difference in hydraulic pressure between the high pressure hydraulic tube and the low pressure hydraulic tube, and
      a compressor driven by the hydraulic motor to compress a portion of exhaust gas of the diesel engine and to supply the portion of the exhaust gas to an intake air tube of the diesel engine; and
   an exhaust heat collecting apparatus including
      a heat exchanger,
      a turbine, and
      a second hydraulic pump,
   wherein the turbine is configured to rotate by a refrigerant heated by absorbing heat of the exhaust gas, via the heat exchanger, and
   wherein the second hydraulic pump is driven by the turbine and configured to supply the hydraulic fluid from the low pressure hydraulic tube to the high pressure hydraulic tube.

2. The powering apparatus according to claim 1, further comprising:
   a supercharger driven by the exhaust gas of the diesel engine to supply compressed aft supplied to the diesel engine; and
   a third hydraulic pump connected to the supercharger, wherein
      the third hydraulic pump operates as a pump to supply the hydraulic fluid from the low pressure hydraulic tube to the high pressure hydraulic tube when an amount of energy in the exhaust gas driving the supercharger is greater than an amount of energy required to compress the air, and the third hydraulic pump is driven by the difference in the hydraulic pressure between the high pressure hydraulic, tube and the low pressure hydraulic tube to operate as a hydraulic motor for assisting driving the supercharger when the amount of the energy in the exhaust gas is smaller than the amount of the energy required to compress the air.

3. The powering apparatus according to claim 1, wherein the hydraulic motor of the exhaust gas recirculating apparatus is a first hydraulic motor, the powering apparatus further comprising
a second hydraulic motor that is driven by the difference in hydraulic pressure between the high pressure hydraulic tube and the low pressure hydraulic tube, and
a fuel pump driven by the second hydraulic motor to pressurize fuel to be supplied from a fuel tank to the diesel engine.

4. The powering apparatus according to claim 3, wherein
the heat exchanger of the exhaust heat collecting apparatus is configured to heat the refrigerant in a liquid-phase via heat transferring from the exhaust gas, and
the exhaust heat collecting apparatus further includes
an additional heat exchanger configured to heat the refrigerant in the liquid-phase,
a two-phase flow nozzle configured to eject the refrigerant in the liquid-phase heated by the first heat exchanger into a gas-phase to produce a gas-liquid-two-phase flow of the refrigerant,
a two-phase flow turbine driven by the gas-liquid-two-phase flow,
a condenser configured to condense the refrigerant in the gas-phase to the gas-liquid-two-phase flow that has passed through the two-phase flow turbine,
a coolant circuit coupling the heat exchanger, the additional heat exchanger, the two-phase flow nozzle, the two-phase flow turbine, and the condenser to form a closed coolant circuit,
a circulating pump configured to circulate the refrigerant in the closed coolant circuit, and
a third hydraulic motor driven by the difference in the hydraulic pressure between the high pressure hydraulic tube and the low pressure hydraulic tube to drive the circulating pump.

5. The powering apparatus according to claim 1, further comprising:
a fuel valve configured to inject fuel into a combustion chamber of the diesel engine;
an exhaust gas valve configured to discharge the exhaust gas from the combustion chamber; and
a hydraulic control unit driven by the difference in the hydraulic pressure between the high pressure hydraulic tube and the low pressure hydraulic tube to control opening and closing of the fuel valve and the exhaust gas valve.

6. The powering apparatus according to claim 2, further comprising:
an intake air manifold connecting the supercharger to the diesel engine; and
an oxygen concentration meter provided in the intake aft manifold to measure an oxygen concentration,
wherein a mixture of air compressed by the supercharger and the exhaust gas compressed by the compressor is supplied to the diesel engine, and
wherein a rotational speed of the hydraulic motor of the exhaust gas recirculating apparatus is adjusted according to the oxygen concentration in the intake air manifold being measured.

7. The powering apparatus according to claim 1, wherein
the exhaust heat collecting apparatus further includes an additional heat exchanger configured to heat the refrigerant with heat of a compressed air supplied to the diesel engine.

8. The powering apparatus according to claim 2, further comprising:
a fourth hydraulic pump driven by the diesel engine to supply the hydraulic fluid from the low pressure hydraulic tube to the third hydraulic pump;
a check valve provided between an outlet of the third hydraulic pump and the high pressure hydraulic tube to prevent the hydraulic fluid from flowing from the high pressure hydraulic tube to the third hydraulic pump;
a bypass tube providing a passage from between the third hydraulic pump and the check valve to the low pressure hydraulic tube; and
an open/close valve configured to open or close the bypass tube, wherein
when the amount of the energy in the exhaust gas driving the supercharger is greater than the amount of the energy required to compress the air, the open/close valve is closed, and the third hydraulic pump operates as a hydraulic pump to supply the hydraulic fluid from the low pressure hydraulic tube to the high pressure hydraulic tube, and
when the amount of the energy in the exhaust gas driving the supercharger is smaller than the amount of the energy required to compress the air, the open/close valve is opened and the third hydraulic pump is driven by a difference between a hydraulic pressure provided by the fourth hydraulic pump and the hydraulic pressure in the low pressure hydraulic tube to operate as a hydraulic motor for assisting driving the supercharger.

9. The powering apparatus according to claim 8, wherein
the fourth hydraulic pump is a variable displacement pump configured to adjust, when the open/close valve is opened, a difference between a hydraulic pressure of the hydraulic fluid supplied from the fourth hydraulic pump to the third hydraulic pump and the hydraulic pressure in the low pressure hydraulic tube to control a rotational speed of the third hydraulic pump operating as a hydraulic motor.

* * * * *